United States Patent [19]

Frey

[11] 4,255,767
[45] Mar. 10, 1981

[54] ELECTRONICALLY CONTROLLED MAGNETIC RECORDING

[75] Inventor: Thomas M. Frey, Brighton, N.Y.

[73] Assignee: Xerox Corporation, Stamford, Conn.

[21] Appl. No.: 3,332

[22] Filed: Jan. 15, 1979

Related U.S. Application Data

[63] Continuation of Ser. No. 783,909, Apr. 1, 1977, abandoned.

[51] Int. Cl.³ .............................................. H04N 1/28
[52] U.S. Cl. .................... 358/301; 346/74.2; 358/298; 358/293
[58] Field of Search ................ 346/74.1; 360/84

[56] References Cited

U.S. PATENT DOCUMENTS

| 2,951,121 | 8/1960  | Conrad  | 346/74.1 |
| 3,108,281 | 10/1963 | Uemura  | 358/301  |
| 3,873,761 | 3/1975  | Bigelow | 358/296  |
| 3,875,587 | 4/1975  | Pugsby  | 358/290  |

*Primary Examiner*—Bernard Konick
*Assistant Examiner*—Alan Faber
*Attorney, Agent, or Firm*—Michael H. Shanahan

[57] ABSTRACT

An electronically controlled magnetic recorder for rapidly optically scanning an original document at a distance and for producing a latent magnetic image thereof. An electronic interface between the optical scanner and the magnetic recording head includes optional electronic halftoning circuitry, circuitry for controlling system and subsystem timing; memory circuits; write drivers and circuitry for controlling pixel alignment.

6 Claims, 14 Drawing Figures

BLOCK DIAGRAM OF PHASE LOCKED LOOP CIRCUIT

TIMING DIAGRAM OF LOAD/UNLOAD CYCLES
(ONE REVOLUTION OF HEAD WHEEL)

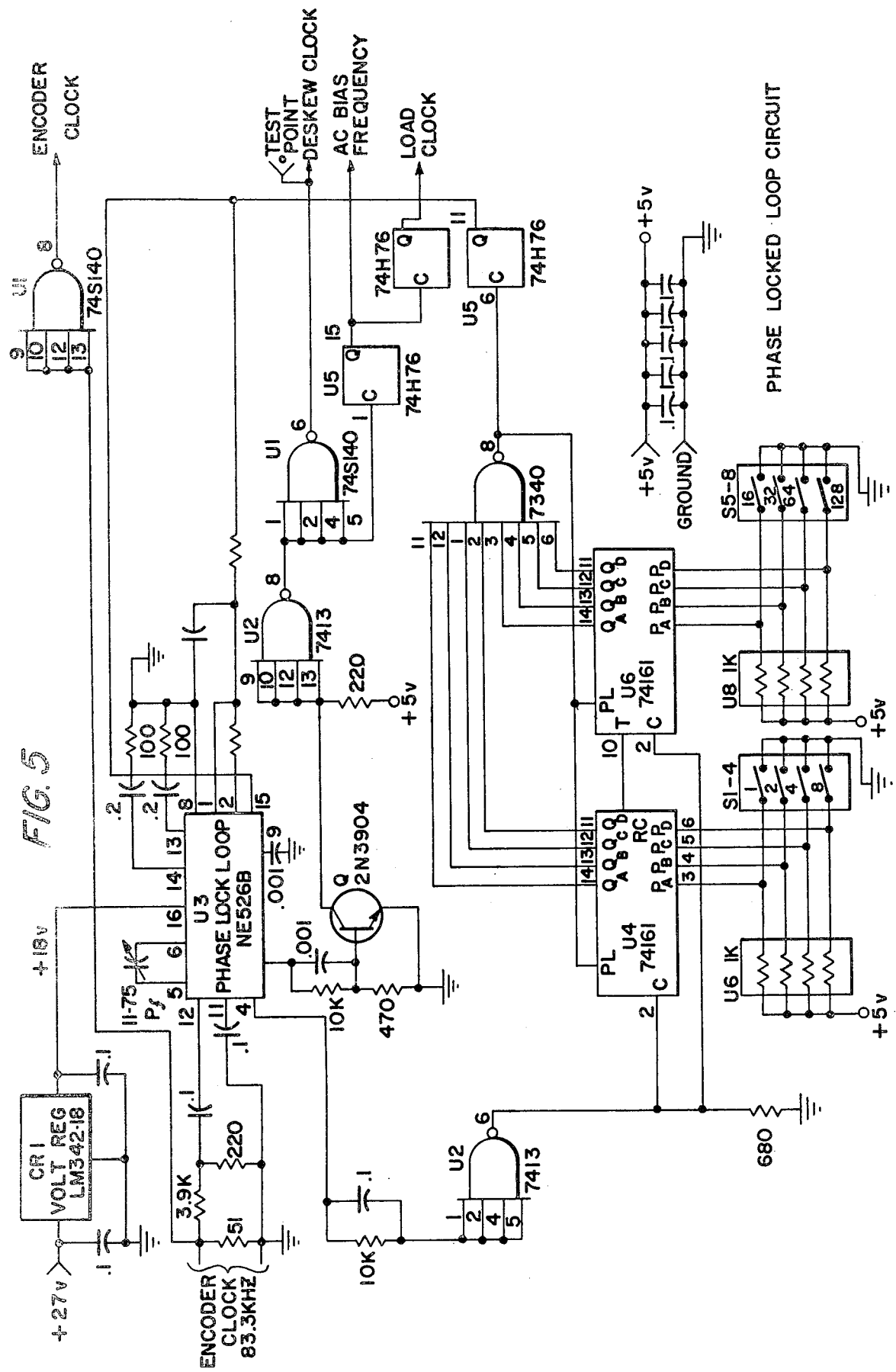

ELECTRONICALLY CONTROLLED MAGNETIC RECORDING

This is a continuation of application Ser. No. 783,909, filed Apr. 1, 1977, now abandoned.

BACKGROUND OF THE INVENTION

This invention relates to magnetic imaging, and more particularly to a magnetic scanner-recorder for optically scanning a document input on a platen with the scanner interfaced with the recorder through electronic circuitry.

The recordation of magnetic signals upon a magnetizable member such as magnetic tape is known. Recorded magnetic signals are used extensively in audio tape recordings, in magnetic video recording as indicated in U.S. Pat. No. 3,108,281 and U.S. Pat. No. 3,862,355.

To obtain faster recording, it was found desirable to move the magnetic recording head and magnetizable medium relative to one another both circumferentially and axially during the writing process. As disclosed in U.S. Pat. No. 2,850,348 for magnetic drum printing and as shown in U.S. Pat. No. 3,845,500 for a rotating magnetic head about which a magnetic tape is helically wrapped during its path of travel.

The magnetic reproduction of hard copy original images has theretofore been limited substantially to rather cumbersome techniques involving intermediates such as the use of an optical mask for thermoremanent or Curie-point imaging; or, the use of a xerographically formed intermediate image which is magnetized and used as a master for either direct development with magnetic toner or for transfer of its pattern of magnetization to a magnetic tape via Curie-point techniques. Alternatively, rather cumbersome techniques requiring the mounting of an original image onto a rotating mandral such as is shown in U.S. Pat. No. 2,826,634 have been required.

SUMMARY OF THE INVENTION

Therefore, an object of this invention is to overcome the above noted deficiencies.

Another object of this invention is to provide a magnetic recorder having rapid optical scanning capability of an original hard copy located at a distance from the optical scanner.

A further object of this invention is to provide a novel magnetic scanning-recorder having a novel electronic interface.

A further object of this invention is to provide a novel magnetic recorder capable of electronically halftoning an optically scanned original hard copy.

A further object of this invention is to provide a magnetic recorder which can electronically store an optically scanned image by facile inputting and outputting of data to and from a computer.

Yet, another object of this invention is to provide a rotating head magnetic recorder having deskew control circuitry to assure proper alignment of recorded pixels to provide a faithful reproduction of an optically scanned image.

Another object of this invention is to provide real-time synchronization of the scanning and the recording operations in both the longitudinal and transverse scanning and recording directions.

Another object of this invention is to electrically eliminate the problem of reverse imaging.

In accordance with the present invention, these and other objects are achieved by a magnetic recorder comprising a first rotational member having a plurality of magnetic write heads disposed thereon; a second rotational member having means thereon for optical scanning; means connecting said first and second rotational members for synchronous rotation, said magnetic write head and said optical scanner being substantially angularly aligned along the circumference of their respective rotational members; and means for electronically converting signals from said optical scanner into reversals of electric current flow through said magnetic write head.

BRIEF DESCRIPTION OF THE DRAWINGS

FIG. 5 is a circuit diagram of the phase locked loop circuit.

DETAILED DESCRIPTION OF THE PREFERRED EMBODIMENT

Figure 1:
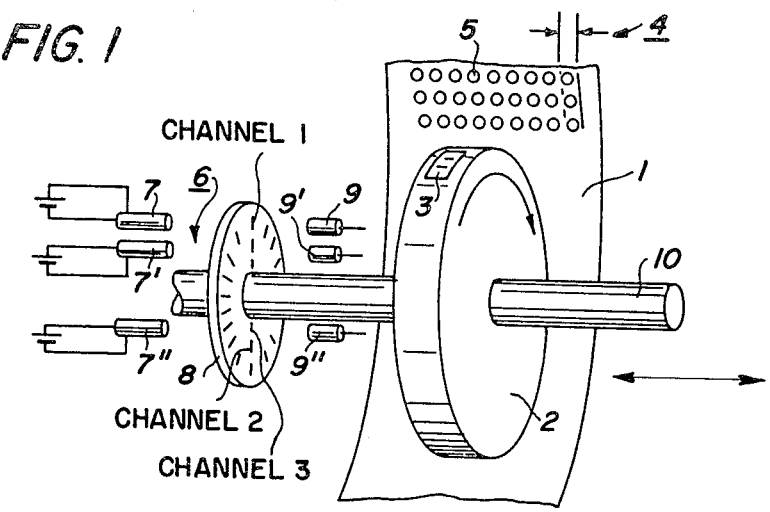
FIG. 1 is a schematic illustration of the rotational member having at least one magnetic write head disposed thereon together with an optical encoder utilized to generate timing signals.

Referring now to FIG. 1, the magnetic recording head 3 for direct recording rotating disc 2 is located on the outer circumference of disc 2. The optical encoder 6 comprises a three channel mask 8 having a multiplicity of alternating transparent and opaque portions in channel one, opaque and transparent portion in channel two and four transparent and opaque portions in channel 3. Stationary light emitting diodes 7, 7' and 7" are mounted adjacent the encoder and positioned to direct light upon mask 8 at channels one, two and three, respectively. Phototransistors 9, 9' and 9" are mounted stationary within the recording device on the side of mask 8 opposite the side on which are mounted the light emitting diodes. Phototransistor 9 is positioned to receive light from light emitting diode 7 passing through transparent portions of channel one and, phototransistors 9' and 9" are similarly positioned but to receive light from light diodes 7' and 7" passing through the transparent region of channels two and three. Channel 3 is selected to have as many transparent and opaque portions as record heads 3 employed on magnetic recording member 2.

With respect to each channel of mask 8, light transmitted through transparent portions of mask 8 is chopped into pulses or bits of light having a frequency dependent upon the speed of rotation of the shaft upon which it is mounted and the number of transparent and opaque portions on the mask.

The number of opaque lines in channel one of mask 8 is chosen as some convenient, predetermined multiple of the desired recording frequency. The higher this multiple then the greater the number of starting points within a pixel length of time is provided. The channel two is used to produce the homing pulse described below. Channel three contains one opaque and transparent portion for each record head mounted on rotating magnetic recording member 2.

Pixels 5 are shown in FIG. 1 as recorded in tracks 4. Magnetic recording medium 1, such as a magnetic tape, is guided around rotating magnetic recording member 2 and held stationary while recording member 2 rotates in recording tracks from top to bottom of FIG. 1, and translates from left to right or from right to left in recording the next succeeding track.

Phototransistors 9, 9' and 9" undergo a variation in voltage and current in their collector circuits when the phototransistors are struck by light. The collector circuit of phototransistor 9 undergoes such a variation at a frequency corresponding to the frequency of the bits of light passing through channel one. The collector circuit of phototransistor 9' undergoes such a change four times per revolution; going from low to high when using a transparent portion for signal generation and going from high to low when using an opaque portion for signal generation. In FIG. 1, four recording heads are utilized and therefore four opaque lines in channel three of optical encoder 6 are provided. Accordingly, phototransistor 9 provides a signal having a frequency which is some predetermined multiple of the desired recording frequency while phototransistor 9' provides a low, "notch" homing pulse signal indicative of the position of magnetic recording heads 3.

Figure 2:
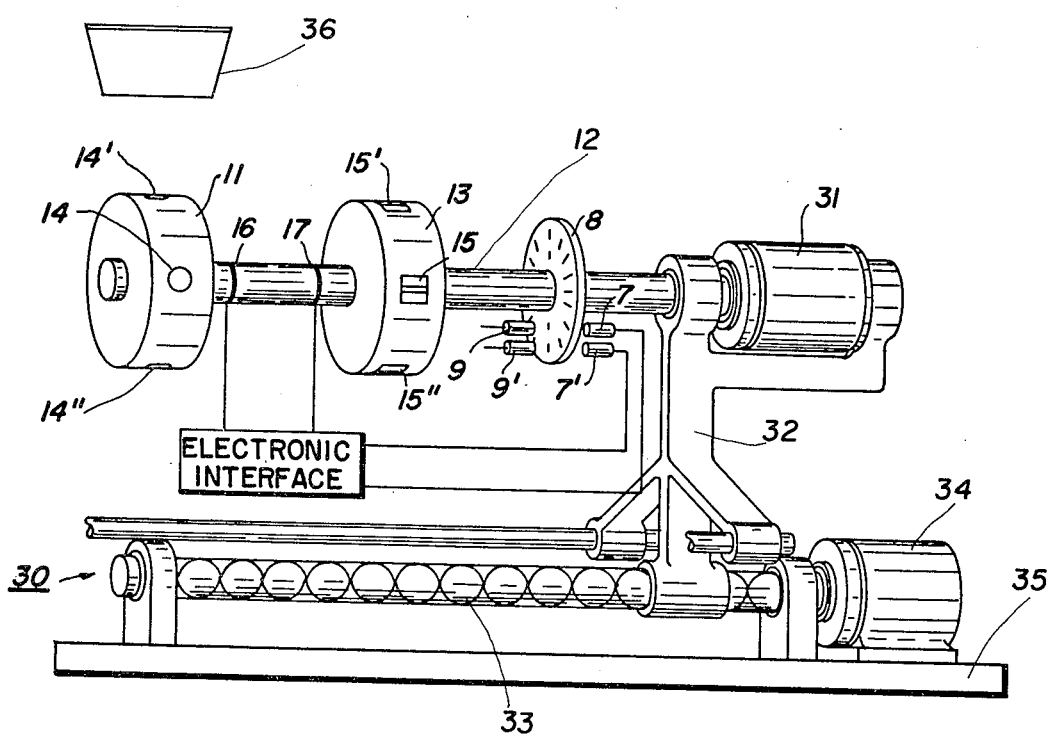
FIG. 2 is a schematic illustration of one embodiment of the magnetic recorder illustrating a plurality of magnetic write heads on a rotational member, a plurality of optical scanners on a rotational member, means connecting the rotational members for synchronous rotation, an optical encoder from which system timing is derived, and the electronic interface therebetween.

Referring now to FIG. 2, there is schematically illustrated a preferred embodiment wherein a plurality of recording head 15, 15', 15" and 15"' (not shown) are equidistantly disposed about the circumference of rotational member 13 and in substantial alignment (within about 0.10 inch) with optical scanners 14, 14', 14" and 14"' (not shown) on rotational member 11. Rotational members 11 and 13 are mounted on shaft 12 so as to provide synchronous rotation of the aligned pairs of magnetic write heads and optical scanners. While the axis of rotation of rotational members 11 and 13 are illustrated in FIG. 2 as being in alignment upon a single shaft 12, it would be appreciated that other means for connecting rotational members 11 and 13 for synchronous rotation can be utilized. For example, gears, chains, pulleys, etc. may be utilized. Furthermore, rotational members 11 and 13 need not have their axis of rotations in alignment, but rather one of the rotational members can be located above, below or to either side of the other rotational member. In FIG. 2, it can be seen that optical encoder 8 with the associated light diodes 7, 7' and 7" and phototransistors 9, 9' and 9" are mounted about the shaft 12. Shaft 12 is rotated by a motor 31 which is mounted on yoke 32 which is part of carriage 30 causing translation of the rotational members 11 and 13. The yoke is coupled to the dual or oppositely threaded screw 33. When screw 33 is rotated, the yoke 32 moves from left to right until it reaches the end of the thread. At that point, the yoke moves back right to left because of the opposite wound thread of the screw. Motor 34 mounted on frame 35 is coupled to the screw 33 to rotate it and thereby translate the carriage 30 in the direction of shaft 12. This in turn causes the scanning elements 14–14"' to translate relative to the platen 36 and the recording heads 15–15"' to translate relative to the magnetic tape wrapped about them.

It will be appreciated that when shaft 12 is not utilized as the means for connecting rotational members 11 and 13 for synchronous rotation, means must be provided to translate rotational members 11 and 13 synchronously in addition to the aforementioned alternate means for providing synchronous rotation. For this reason, the embodiment depicted in FIG. 2 is particularly preferred. It provides synchronization of scanning and recording in the longitudinal axis (translational movement) because the distance between the two rotational members is fixed. FIG. 2 also provides the additional advantage that all required triggering signals for the optical scanners can be obtained from the same optical encoder used for the magnetic write heads. Paired alignment of magnetic write heads and optical scanners results in simplified imaging synchronization because the same digital clock (derived from the optical encoder) is used for both rotation memers. This simplification allows the system to work real time without the use of large memory storage and with a simplified electronic interface between the optical scanners and the magnetic write heads.

Two very desirable achievements are provided by the present invention. One is the ability to remove the original document away from the surface of the optical scanner to thereby allow copying of all original documents including hard bound copy. For scanners on a rotational member having a radius R and having n number of scanning elements thereon, the original document platen is located at a distance of n R from the center of the rotating member and thereby allows scanning a single line at a rate n times as fast as would be achieved when the original document were located at the periphery of the rotating member. For n number of scanners, each sequential scanner scans a complete line of the original each 1/n of a revolution of the rotating member. Each scanner scans 1 line per revolution of the rotating member 11. Four lines are scanned each revolution of member 11 when four scanners are used on rotating member 11. On the other hand, it is desirable to have the stationary magnetic tape 1 wrapped around about 75% of the rotating recording member 13. This leaves only 25% of the revolution time to load data from the optical scanner into memory. The load time occurs simultaneously with the scan time; the unload time for data from memory to the appropriate write head occurs simultaneously with the record time.

Figure 9:
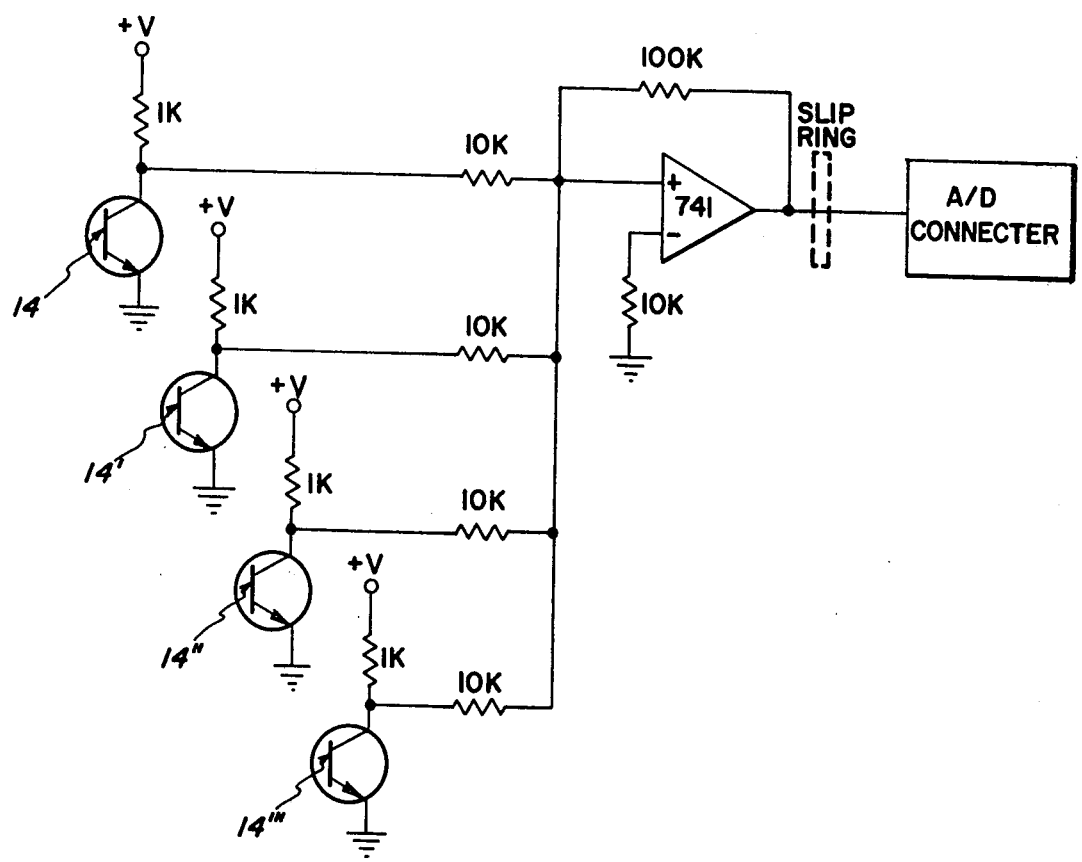
FIG. 9 is a schematic illustration of the scanning electronics.

FIG. 9 schematically illustrates the scanning electronics mounted on the rotating member 11 and electrically connected between optical scanners 14, 14', 14", 14"' and the analog to digital converter. As seen in FIG. 9, the voltage outputs of the photo-voltaic cells in optical scanners 14–14"' are summed by summing amplifier 741. The output of 741 passes through slip-rings on shaft 12 and is directed into the analog to digital converter.

Figure 3:
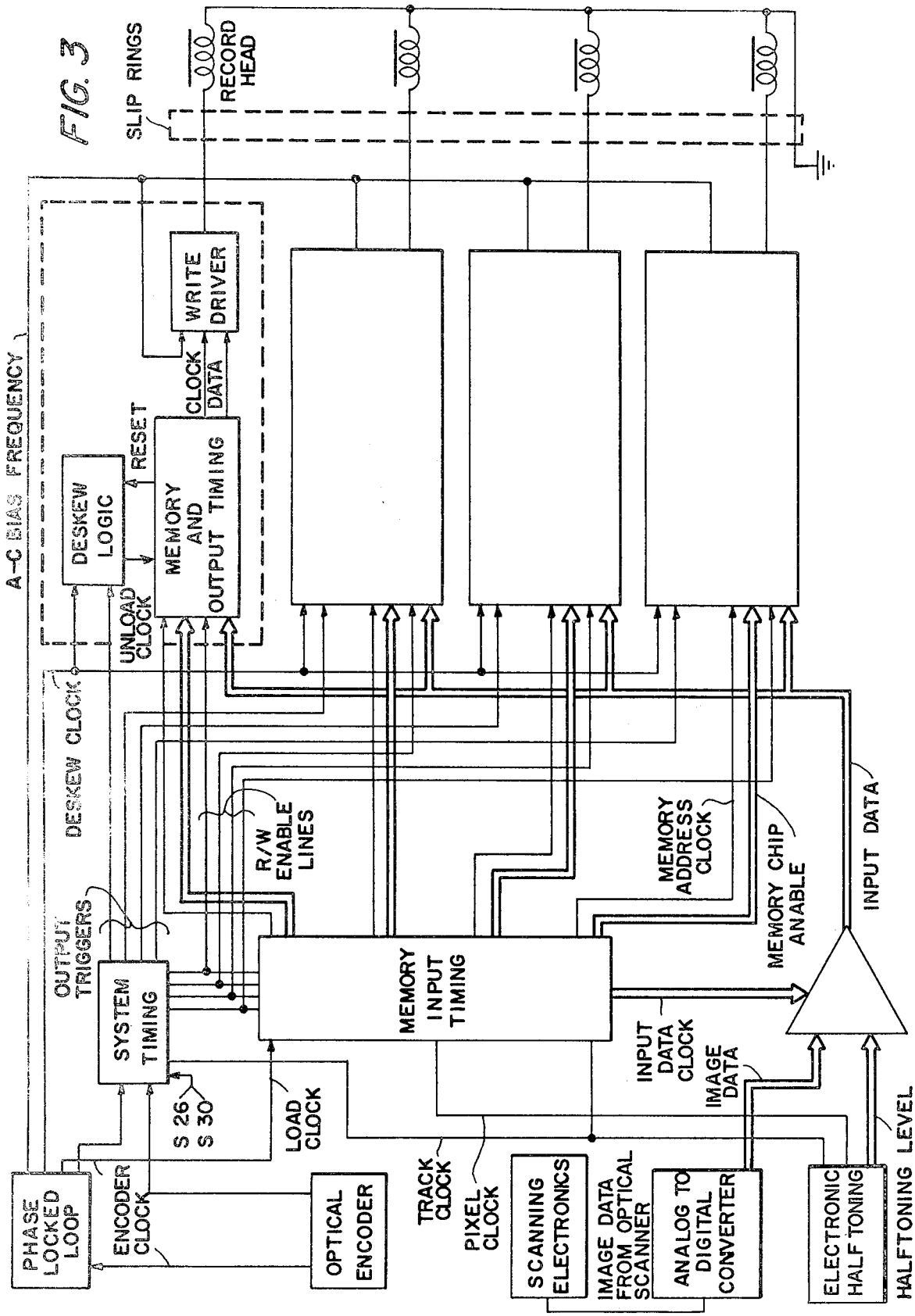
FIG. 3 is a block diagram of the electronic interface.

Referring now to FIG. 3, there is seen a block diagram of the electronic interface between the optical scanners and the magnetic write heads. The fundamental task of the electronic interface is to produce a current through the magnetic write heads and to alter the direction of the current at the precise time when a recorded dot is desired on the magnetic tape so that a latent magnetic image corresponding to the optically scanned original hard copy is produced. When the direction of the current is reversed from its previous direction of flow through the magnetic write heads, a magnetic field gradient is generated which is referred to herein as a pixel. Precise timing is required in order to achieve proper phase alignment of pixels in adjacent record tracks on the magnetic tape in order to prevent cancellation of the magnetic field between the tracks. Cancellation of the magnetic field between the tracks will result in deteriorated developed images, rendered visible with magnetic marking material commonly referred to as magnetic toner. In the discussion that follows, it is assumed that a maximum phase variation between pixels in adjacent record tracks are to be within plus or minus 90°, the recording wavelength is to be about 67.7 microns and the rotational speed of shaft 12 is such that the magnetic write head to magnetic tape speed is about 2327 centimeters per second. With these assumed values, as an example, the maximum cumulative error in timing between recorded tracks is plus or minus 727 nanoseconds. This amounts to a variation in timing of plus or minus 0.006 percent of one revolution.

The control circuitry gains all its timing information to synchronize the recording from a three channel optical encoder (1000 bits/revolution in Channel One, one bit/revolution in Channel Two and four bits/revolution in Channel Three). The outputs (TTL compatible) are a squarewave 1000 times the revolution per second of the head wheel 13 (hereinafter, the encoder clock), one pulse per revolution (hereinafter, the homing pulse) and four pulses per revolution (the head clock). Due to its sensitive threshold voltage the optical encoder 6 has a separate 5 V power supply to remove any noise generated by other equipment. The encoder ground is isolated from the system by coupling the outputs of the encoder through photon coupled isolators (GE-74A1) to the Phase-Locked Loop circuit and system timing circuit.

Figure 4:
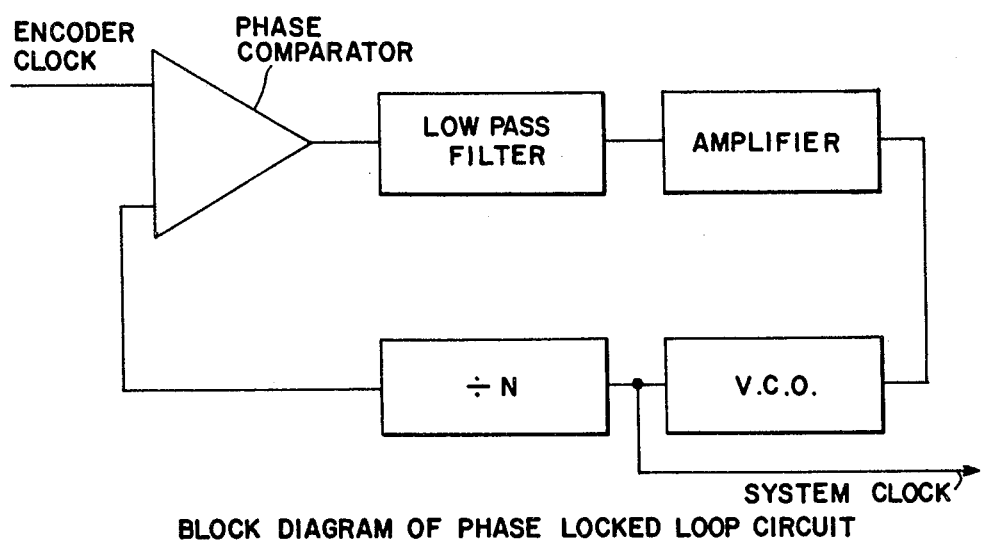
FIG. 4 is a block diagram of the phase locked loop circuit of the electronic interface.

The system clock is locked to the angular velocity of head wheel 13 by the Phase-Locked Loop of FIGS. 4 and 5 (hereinafter, PLL). The PLL circuit is a feed back system comprised of a phase comparator, low pass filter, error amplifier, voltage-controlled oscillator (hereinafter, VCO) and divide-by-n circuit. The PLL's input is the encoder clock and its output is the system clock which is a multiple of the input signal. In short the basic operation of the system is that an input signal is applied to the phase comparator which compares the phase and frequency of the input with the VCO frequency divided by n. An error voltage is generated that is related to the phase and frequency difference between the two signals. This error voltage is then filtered, amplified and applied to the control terminal of the VCO. In this manner, the control voltage forces the VCO frequency to vary in a direction that reduces the frequency difference between the two frequencies. When the two frequencies are sufficiently close, the feedback nature of the PLL causes the two to be synchronized or locked. Once in lock the VCO frequency is identical to the input signal except that it is actually running at a multiple of the input frequency.

By dividing the system clock down by various values, all other frequencies for the image control system are obtained. Table I shows the different frequencies and the division factors.

TABLE I

| Image Control System Frequencies |
|---|
| Deskew Clock = System Clock (9.66 MHz) |
| Erase Clock = ½ of System Clock (4.83 MHz) |
| Load Ram Clock = ¼ of System Clock (2.41 MHz) |
| Unload Ram Clock = 1/16 of System Clock (604 KHz) |
| Write Driver Clock = 1/32 of System Clock (302 KHz) |
| Encoder Clock = 1/116 of System Clock (83.3 KHz) |

The multiplication factor of the PLL circuit is determined by the ratio required between the system and encoder clocks for a particular wavelength and this ratio can be varied. Two adjustments are to be made to the circuit: (1) the center frequency of the VCO is aligned near the new system clock center frequency by adjusting C1 with no input applied, and (2) N (an 8 bit binary number on switches $S_1$LSB–$S_8$MSB) must be set equal to:

$$N = 256 - (n/2),$$

where n equals the desired multiplication factor of the PLL circuit.

Figure 7:
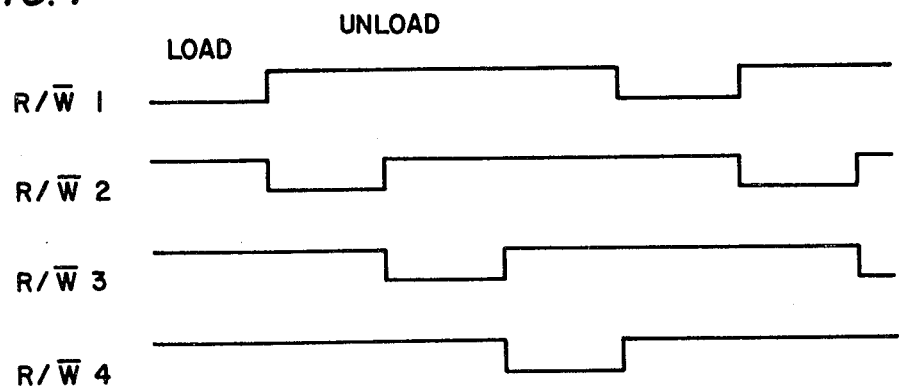
FIG. 7 is a timing diagram of memory load and unload cycles.
Figure 6:
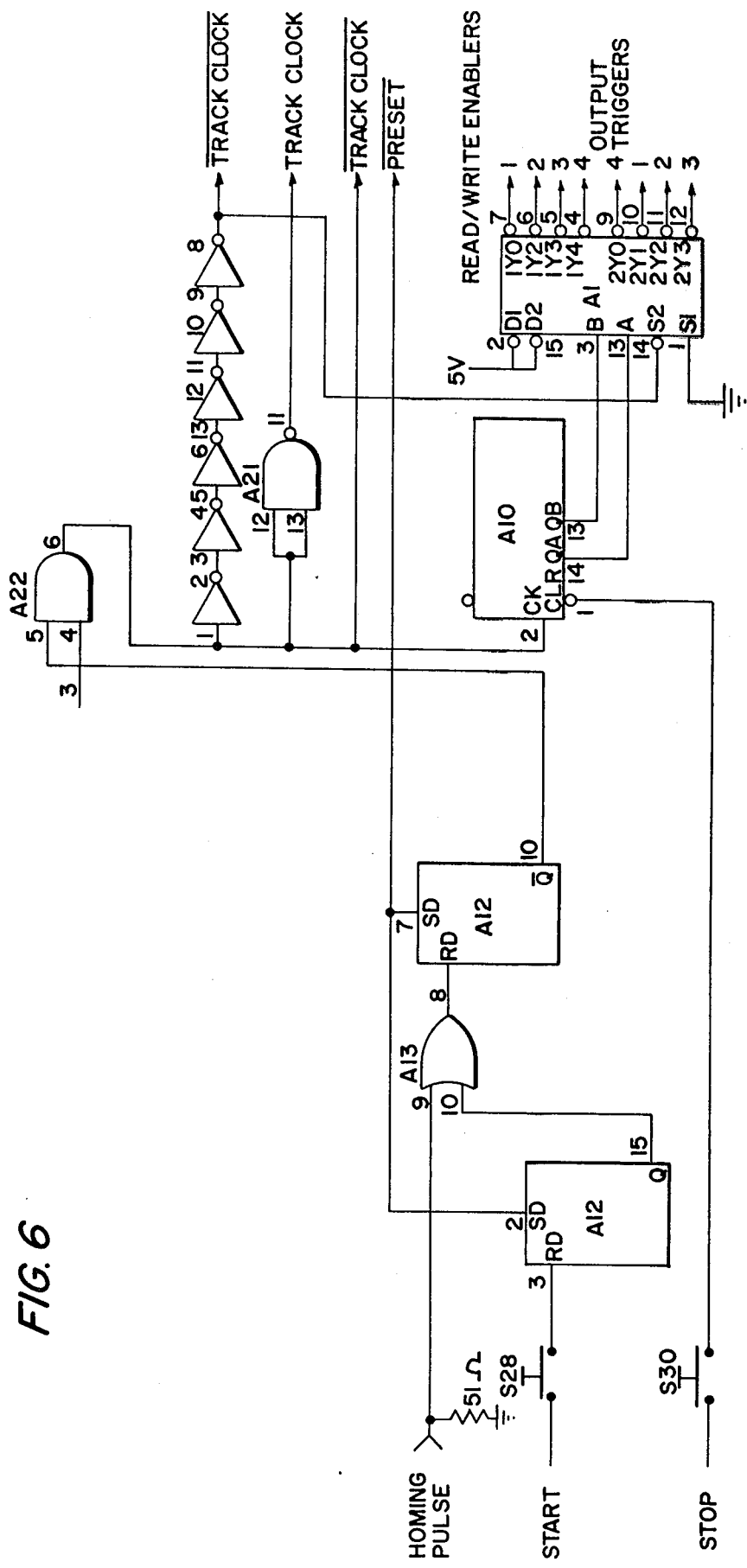
FIG. 6 is a system timing circuit diagram.

The system timing circuit supplied the enables and triggers required to operate the remaining circuits of the electronic interface. It is shown in FIG. 6. It has four inputs and ten outputs. The stop button S30 ends the recording mode and sets the logic to its proper state to begin another recording. The start button S28 triggers flip-flop A12 which resets the Q output low enabling the next homing pulse to start a recording. The homing pulse which is a high going low (H→L) rests the $\overline{Q}$ output of A12 to a high. This enables the head clock to generate the track clock which begins the recording. The track clock goes to a binary counter chip A10 which is used to address a dual 2-line-to-4-line decoder. The decoder A1 has two sets of outputs. Only the line selected by the applied address is able to go low when the enable is proper for that half of the decoder. The outputs 1Y0–1Y3 are the enable lines for the memory input and output timing circuits with an enable being low during the load period and high during the unload period. The second half's outputs 2Y0–2H3, which are only enabled during the A11 output pulse width, are used to start the deskew circuits. FIG. 7 shows the output levels of R/$\overline{W}$ enable lines with respect to load and unload times. Two other outputs come off this circuit. One is the preset for the system and the second is the track clock (TC) which is the output of A11 and goes to the electronic halftoning circuit and memory input timing circuit.

Figure 8:
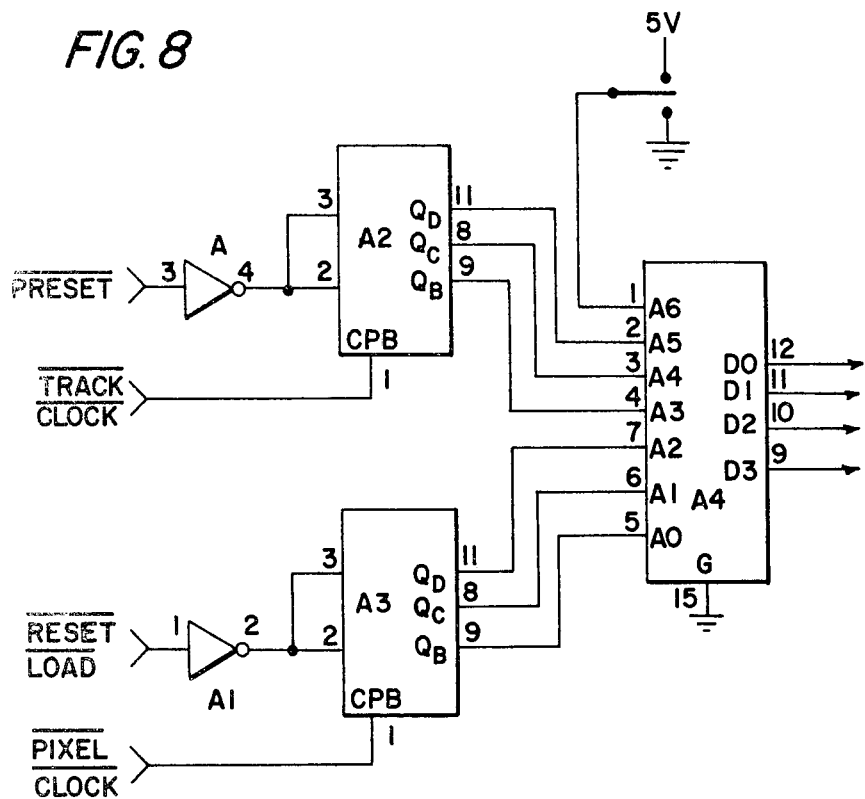
FIG. 8 is a diagram of the electronic halftoning circuit.

The electronic halftoning circuits, shown in FIG. 8, generates reference halftoning levels which are later compared with the desired image level to be recorded. The levels are set in PROM A4. The addresses of A4 have three input sources. Two (A2 and A3) are BCD counters which count the track and pixel clocks, respectively. The third is a switch which activates the electronic halftoning circuit.

Figure 10:
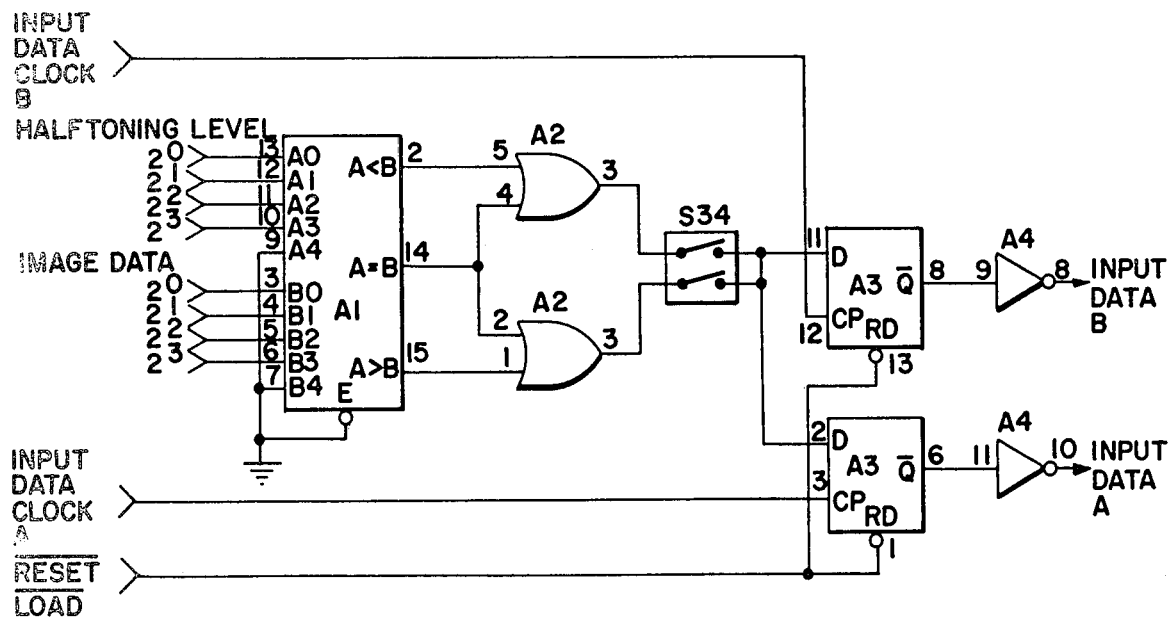
FIG. 10 is a circuit diagram for the comparator circuit which compares the image data to the electronic halftoning level selected to determine if a pixel should be written by the magnetic write heads.

The comparator circuit of FIG. 10 with its inputs from the optical scanner and the electronic halftoning circuit (A0–A3) determines if a pixel should be written in that area of the magnetic image. By changing the settings on S34 a positive or negative image can be recorded. The input data clocks, two clocks 180° out of phase, and ½ the rate of the load clock are used to load the output of the comparator (A1) into data flip-flops A3.

Figure 11:
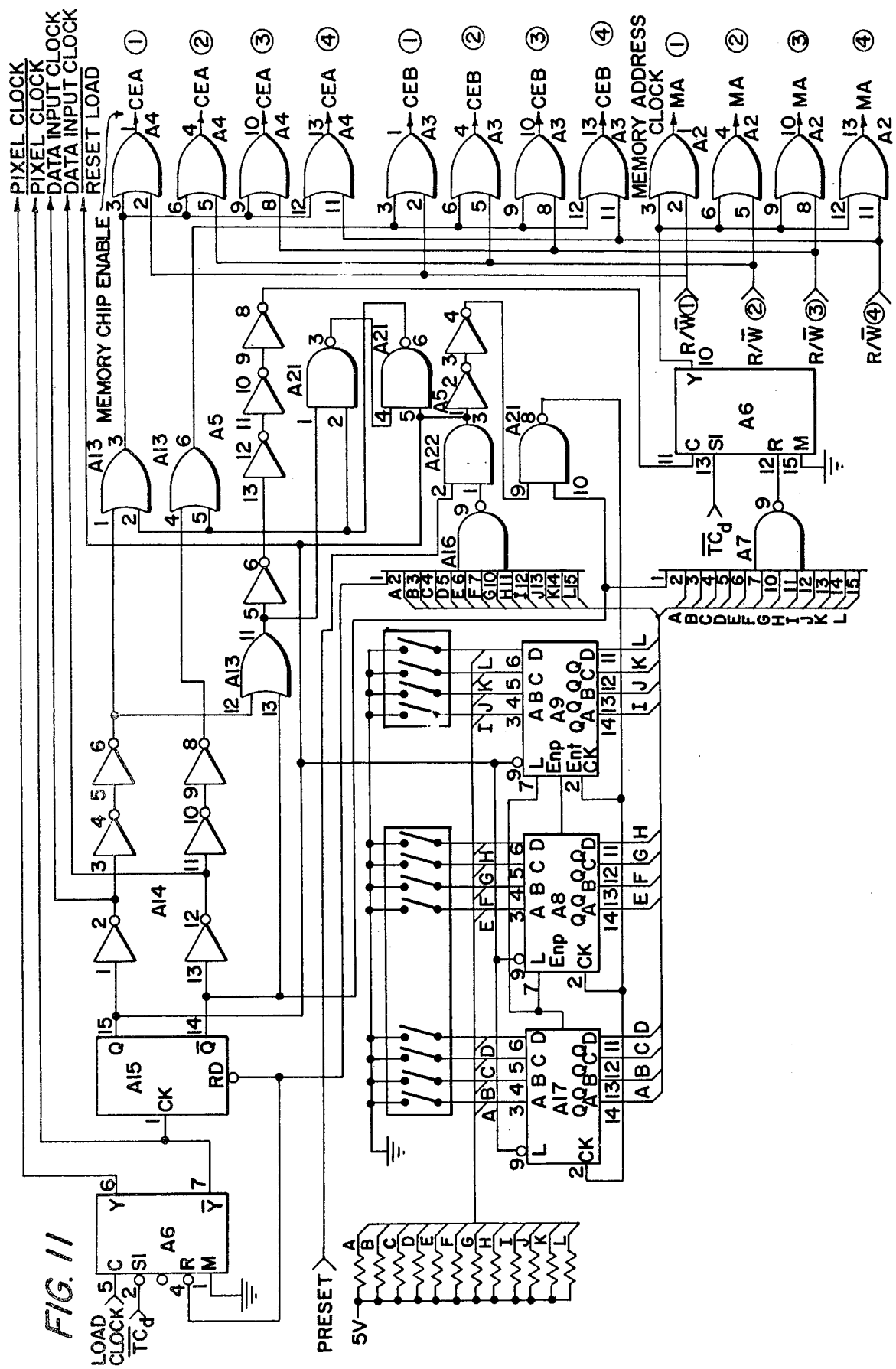
FIG. 11 is a diagram of the memory input timing circuit.

The memory input timing circuit of FIG. 11 generates the signals required to load the data output of the comparator into an 8K buffer memory. The circuit has 4 inputs and 6 sets of outputs. A preset is used to prepare the circuit to begin a load cycle in one of the 4 memory buffers. The memory buffer in which the load cycle is occurring is selected by a low level signal on its $R/\overline{W}$ enable line. A load cycle required ¼ of a revolution of the head wheel and begins with buffer 1. The sequence of buffers followed is then 2, 3, 4, 1, 2, etc. until the recording is complete. A load cycle is begun by a high to low signal transition on the track clock delayed ($\overline{TCd}$) which initiates pulse synchronizer A6. The input to A6 is the load clock which is ¼ of the system clock. The output, the pixel clock, is counted up by A8, A9 and A17 and when binary 4095 is reached the circuit is reset by the reset load signal and awaits another high to low signal transition on the $\overline{TCd}$. The number (n) of pixels in each track is determined by $2\times(4096-N)$ where N is the number preloaded into the counters by SA LSB–SL MSB. The remaining sets of outputs are generated by dividing the pixel clock by 2. The input data clocks go to the comparator circuit and load the data on data flip-flops. The memory chip enables (CEA1–CEA4, CEB1–CEB4) are the chip enables for the 8 RAMs.

Figure 12:
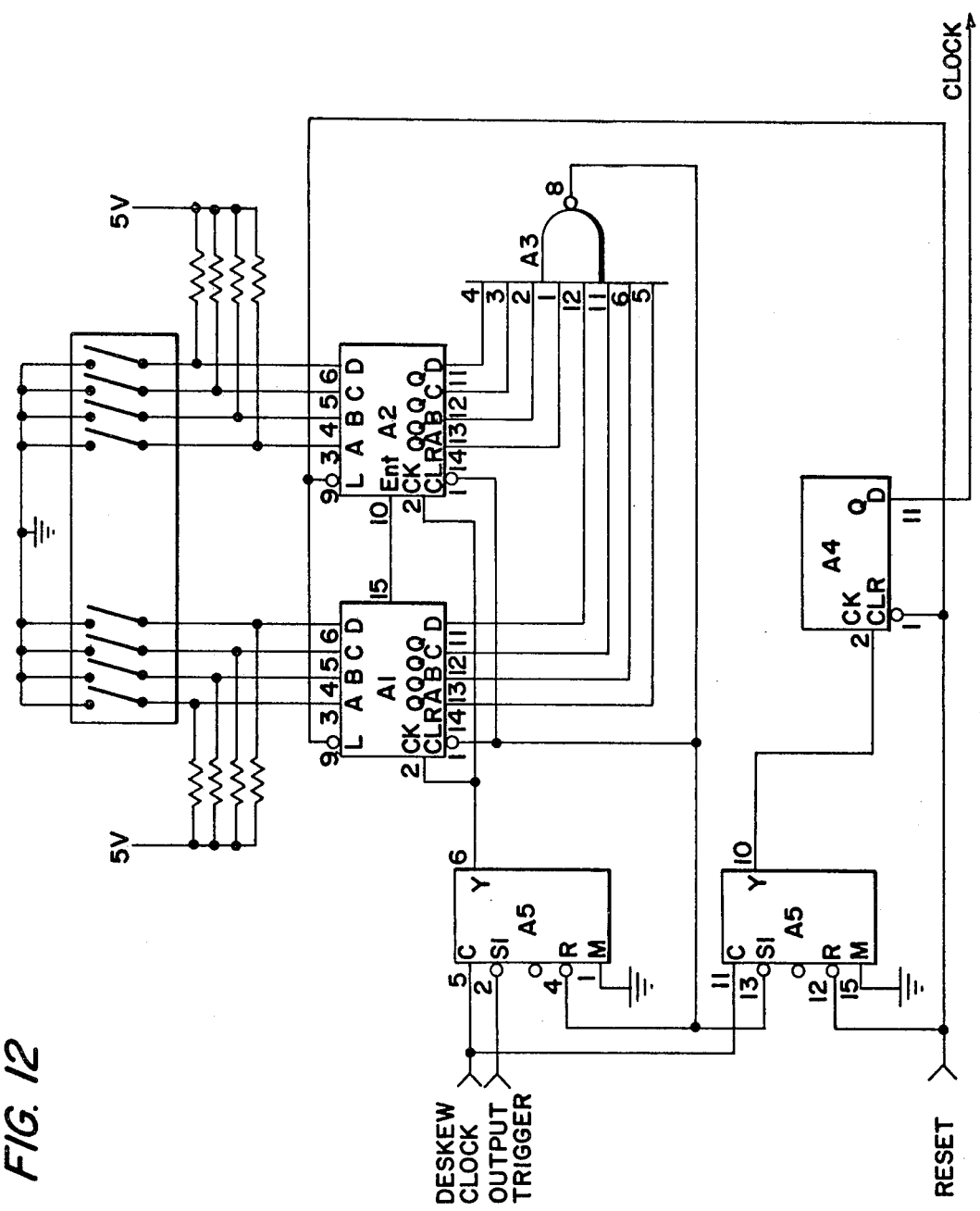
FIG. 12 is a circuit diagram for the deskew circuitry.

The deskew logic provides the unload clock for the memory. The deskew circuit is shown in FIG. 12. The output trigger generates a delayed pulse which is used to initiate the unload or record cycle. Once begun, the deskew frequency is passed by the pulse synchronizer (A5) with the output divided-by-16 by A4 to create the unload clock. The time between the output trigger and the initiation of the unload can be varied by the number set on the switches at the parallel data inputs of A1 and A2. This variable delay allows greater tolerance on the exact location of the record heads around the outer tolerance on the exact location of the recod heads around the outer circumference of the head wheel. The circuit is reset by a signal created in the memory and output timing circuit.

Figure 13:
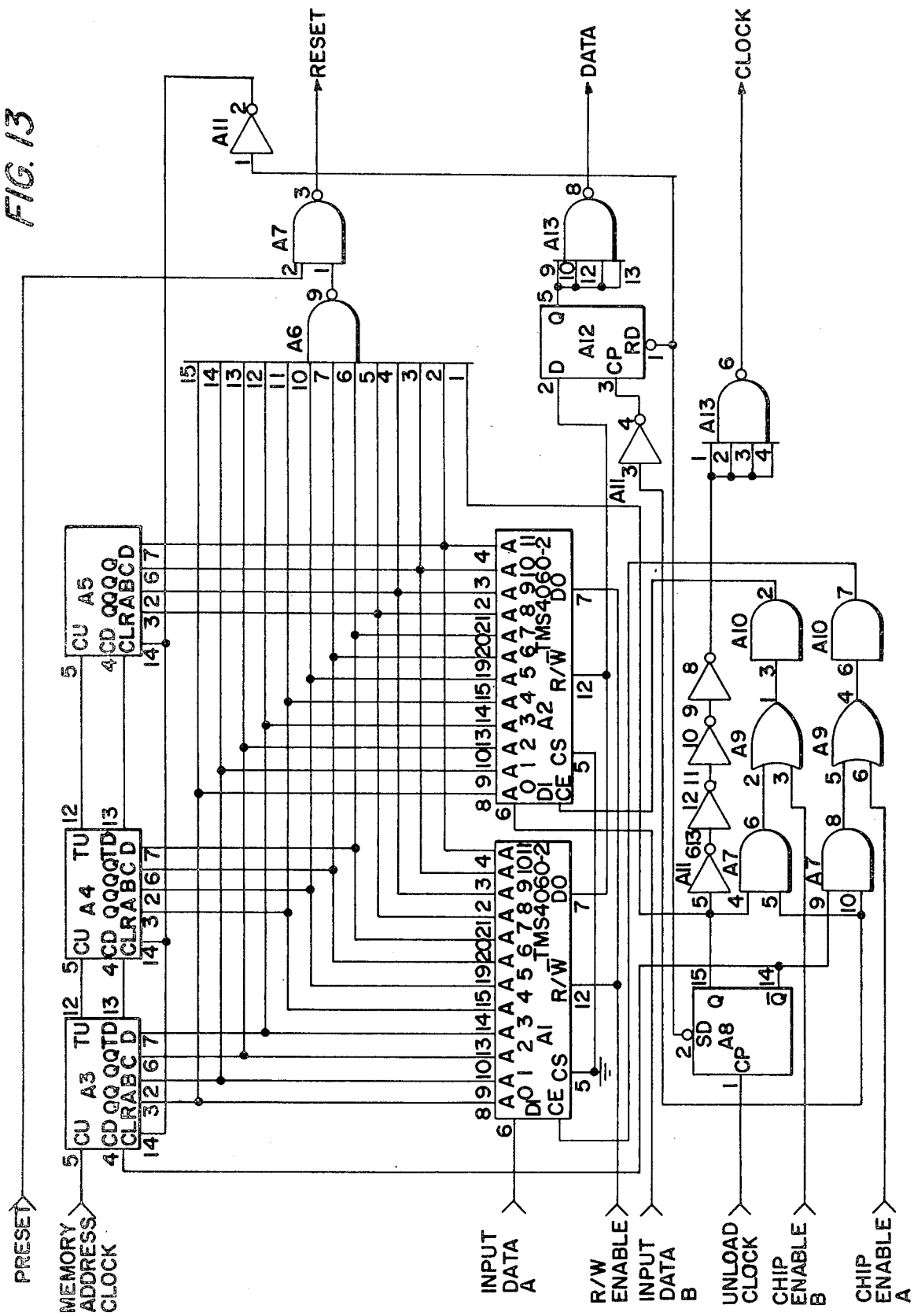
FIG. 13 is a diagram of the memory and output timing circuit.

All of the inputs to the memory and output timing circuit have been discussed. The memory and output timing circuit itself is shown in FIG. 13. Each buffer has two 4K RAMs (TMS 4060-2). The buffer handles data as first-in-last-out. During loading and unloading the data is alternated between the two RAMs in each buffer which doubles the effective speed of the buffer. The unload chip enables and memory address clocks are generated from the unload clock just as the load signals are generated on the memory input timing circuit. The load and unload chip enables are then gated together and applied to their respected RAMs. The memory address clock for the load cycle (four times the unload clock) is applied to the count-up input of the binary counters (A3–A5) that address the RAMs. The memory address clock for the unload cycle is applied to the count-down input of the binary counters (A3–A5). When the address to the RAM is counted down to $1FFF_{16}$ the output of the 13 input NAND gate generates the reset output that marks the end of the unload cycle and resets the circuits for the next load cycle. The unload clock is used to load the data flip-flop when the data is valid at the output of the RAMs. The unload clock is also delayed and, with the data, is outputed to the write driver.

Figure 14:
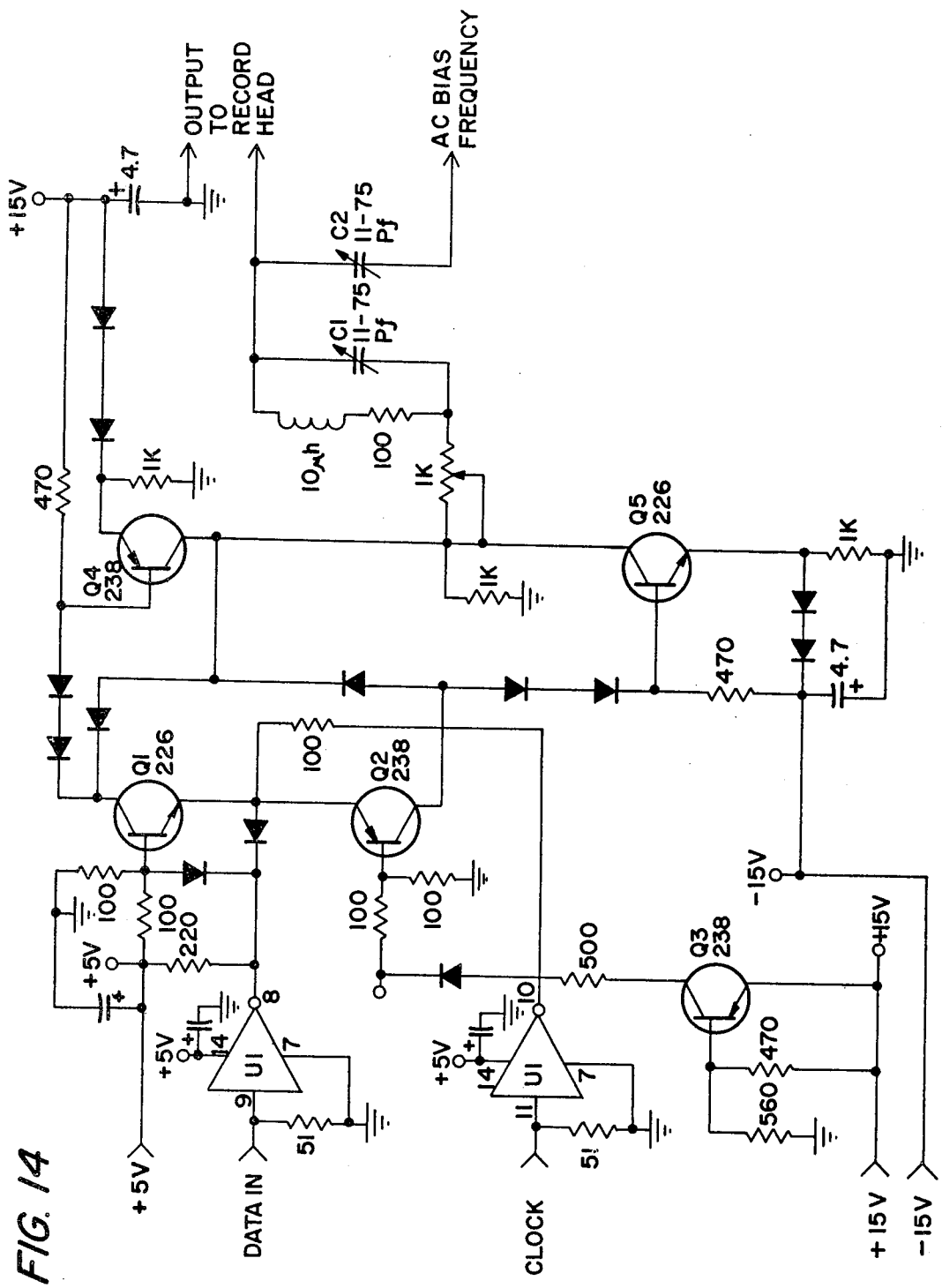
FIG. 14 is a diagram of the driver circuit for the magnetic write heads.

The write driver circuit of FIG. 14 employs the AC bias method of recording. The circuit gates the clock and data together and then sums the bias frequency. The bias frequency will erase the magnetic tape when the data applied to the circuit is high. The circuit has three settings. C1 and R1 set the level of the data, and C2 sets the level of the bias frequency.

Optical encoder 6 can be obtained from Renco Corporation of Galeta, California. The resistances depicted in the drawings are in ohms and the capacitances depicted in the drawings are in microfarads, unless otherwise noted. All integrated circuit components can be obtained under the item numbers indicated in the drawings from either Texas Instruments Corporation or Fairchild Corporation. Optical scanners 14, 14', 14" and 14''' can each comprise a lens and photovoltaic cell. Such optical scanners are well known in the art and need not be elaborated upon herein. Further, the analog to digital converter interfacing the optical scanner with the comparator (FIG. 3) is well known in the art and need not be elaborated upon. The design and availability of such converters is well established as is evidenced from Fundamentals and Applications of Digitalogic Circuits, Sol Libes, Hayden Book Company, 1975, pages 138 et seq.

It will be appreciated that other modifications and ramifications of the present invention will occur to those skilled in the art upon a reading of the present disclosure. For example, while the preferred embodiment described and shown in the Figures utilizes integrated circuitry, it will be appreciated that equivalent circuitry comprised of discrete components can be utilized. Furthermore, it would be appreciated that while the preferred embodiment has been described with respect to four optical scanners and magnetic write (record) heads, the invention can be applied equally to any number of optical scanners and magnetic record heads by appropriately modifying the circuitry in accordance with the practice of the present invention.

Moreover, the optical scanner can comprise a flying spot scanner such as that disclosed in U.S. Pat. No. 3,973,825, hereby expressly incorporated by reference. Or, optical scanning wherein light sources are mounted on rotating member 11 in place of 14, 14', 14", 14''' and photo-cells are mounted below the document platen and positioned to receive light reflected from the document can be employed.

The system can be automated by replacing the various switches in the system with a micro-processor such as an MC-6800. A program loaded in a ROM can be used to control the micro-processor. Information from the optical scanner could be inputted into a computor's memory for storage and retrieved for processing by the electronic interface at a later time. The tie point for the computer interface is the output line of the comparator.

What is claimed is:

1. A magnetic image recorder for optically scanning an original document and for producing a latent magnetic image thereof comprising platen means for supporting a document to be recorded, a second rotational member having n number of magnetic recording heads thereon at a distance R from its axis of rotation corresponding to the n number of scanning means, a first rotational member having n number of scanning means thereon, the member being spaced from its axis of rotation to the platen means by a distance of about n times R to enable each scanning means to scan segments of a document on the platen means to generate a series of data signals representative of the optical density levels of segments on a document where n is an integer equal to or greater than two, first translation means for effecting relative movement between the platen means and the first rotational member in a direction generally normal to the scanned segment of a document to enable each of the n scanning means to scan adjacent, generally parallel, segments of a document, magnetic tape supporting means for supporting a magnetic tape adjacent the second rotational member to enable each recording head to record a series of magnetic transitions along a segment of a magnetic tape, second translation means for effecting relative movement between the magnetic tape supporting means and the second rotational member to enable each of the n recording heads to record on adjacent, generally parallel, segments of a magnetic tape and synchronous means for effecting synchronous rotation of the first and second rotational members and synchronous movement of the first and second translation means, buffer means including n number of storage means each coupled to a corresponding scanning means and recording head, load means for loading data signals into a sotrage means during the generation thereof at a rate of about 1/n times one revolution time period of the first rotational means and unload means for unloading data signals from a storage means to a recording head at a rate of about (n−1)/n times one revolution time period of the first rotational means.

2. The recorder of claim 1 wherein said magnetic transitions recorded on a magnetic tape are generated by means for applying reversals of electric current flow within a fixed wave length to the recording heads and further including deskew circuit means for timing the reversals of current to occur at least within plus or minus 90 degrees of the fixed wavelength from segment to segment.

3. The recorder of claim 1 wherein said synchronous means includes a single shaft mounted for rotation to which said first and second rotational means are coupled, and wherein said shaft is mounted for movement relative to stationary platen means and stationary magnetic tape support means.

4. The recorder of claim 1 wherein said magnetic tape supporting means supports a tape adjacent the second roational member over about (n−1)/n times a circumference of the rotational member.

5. The recorder of claim 1 further including half-toning circuit means for modifying data signals generated by the scanning means to represent a half-toned image.

6. A magnetic image recording process for optically scanning an original document and for producing a latent magnetic image thereof comprising rotating n number of magnetic recording heads about an axis of rotation at a distance about R from the axis, rotating n number of optical scanning elements about an axis of rotation with the axis of rotation being about n times R from a document to be recorded where n is an integer equal to or greater than two moving the rotating scanning elements and a document to be recorded relative to each other in the direction of the axis of rotation for the scanning elements enabling n number of generally parallel segments of a document to be scanned by the n scanning elements each revolution with each scanning element generating series of data signals representative of optical density variations along the scanned segments of a document, moving the rotating recording heads and a magnetic tape on which a magnetic image to be recorded relative to each other in the direction of the axis of rotation for the recording heads enabling n number of generally parallel segments of the magnetic tape to be recorded each revolution by the recording heads as a series of magnetic transitions created by reversals of current to the recording heads, synchronizing the rotation of the scanning elements with the rotation of the recording heads and the relative movement of the scanning means and document with the relative movement of the recording heads and magnetic tape and, loading the data signals from the n scanning elements into corresponding n number of storage devices during the generation of the data signals and unloading the data signals from the n storage devices to corresponding recording heads after the generation of data signals by a scanning element and before the completion of the balance of the revolution by the scanning element, whereby a magnetic image of a document is recorded on the magnetic tape.

* * * * *